United States Patent Office 3,822,344
Patented July 2, 1974

3,822,344
PHARMACEUTICAL COMPOSITIONS PROVIDING POTASSIUM CHLORIDE IN AQUEOUS SOLUTION
Alfred Eric Corker, Brighton, England, assignor to Arthur H. Cox & Co. Ltd., Brighton, England
No Drawing. Continuation of application Ser. No. 80,469, Oct. 13, 1970, now Patent No. 3,708,574, which is a continuation of abandoned application Ser. No. 722,544, Apr. 19, 1968. This application Feb. 14, 1972, Ser. No. 226,318
Claims priority, application Great Britain, Apr. 29, 1967, 19,796/67; Aug. 2, 1967, 45,471/67
The portion of the term of the patent subsequent to Jan. 2, 1990, has been disclaimed
Int. Cl. A61k 9/00
U.S. Cl. 424—44    2 Claims

ABSTRACT OF THE DISCLOSURE

Aqueous solutions containing potassium chloride, useful for the treatment of hypokalaemia, are obtained by dissolving in water or an aqueous medium compositions comprising a mixture of a solid, water-soluble hydrochloride of a physiologically innocuous nitrogen-containing organic compound, which dissociates on addition to water to yield an acid solution containing hydrochloric acid and the organic base, e.g. glycine hydrochloride, and at least one of potassium bicarbonate and potassium carbonate.

---

This application is a continuation of my application Ser. No. 80,469, filed Oct. 13, 1970, now Pat. No. 3,708,-574, itself a continuation of my application Ser. No. 722,544, filed Apr. 19, 1968, and now abandoned.

This invention relates to pharmaceutical compositions and, more particularly, to compositions in tablet form which can readily be used for the production of potassium chloride for oral administration.

In many treatments of patients, for example in the treatment of oedema and hypertension with some diuretics, it is necessary to replace excreted potassium by the administration of potassium in an assimilable form. This is usually effected by the oral administration of potassium chloride, in the form either of uncoated tablets, or of enteric coated tablets. Both methods, however, have disadvantages which render them unsuitable in particular cases. Uncoated tablets of potassium chloride often take a long time to dissolve and produce a solution of potassium chloride in the stomach which many patients find nauseating. Enteric coated tablets have a variable solubility and may, in fact pass through the body without dissolving. Moreover, with both uncoated and enteric coated tablets, there is a danger that the tablet may adhere to the intestinal mucosa and produce a high local concentration of potassium chloride which may lead to intestinal ulceration.

In order to avoid these disadvantages, it has been proposed to administer the potassium as a salt other than potassium chloride, for example as potassium citrate or tartrate. The use of such salts, however, introduces the danger of creating an alkalosis in the patient.

Moreover, it is known that diuretic drugs encourage the excretion of chloride ion, and it has been found in practice that in the presence of a chloride deficiency it is not possible to replace a potassium deficiency unless the chloride deficiency is replaced simultaneously. In such circumstances, therefore, the potassium cannot be assimilated unless it is associated with chloride ions.

Another approach to the problem has been the use of so-called slow release tablets of potassium chloride in which the potassium chloride is slowly released during the passage of the tablet through the alimentary tract. While the use of such tablets may be effective in preventing the formation of a nauseous concentration of potassium chloride in the stomach, they still are open to the objection that they may adhere to the intestinal wall and cause ulceration.

It is the object of the present invention to provide pharmaceutical compositions which can be used to provide potassium chloride in an orally administrable form, for the treatment of hypokalaemia (with or without associated hypochloraemia) and, at the same time, not causing nausea in the patient or ulceration or stenosis of the wall of the alimentary tract.

According to the present invention, there are provided pharmaceutical compositions comprising a mixture of a solid, water-soluble hydrochloride of a physiologically innocuous nitrogen-containing organic compound which dissociates on addition to water to yield an acid solution containing hydrochloric acid and the organic base, and at least one of potassium bicarbonate and potassium carbonate, the compositions producing on addition to water an effervescent solution containing potassium chloride. Preferably potassium bicarbonate alone is employed in the mixture because of the tendency for potassium carbonate to deliquesce.

By the term "physiologically innocuous nitrogen-containing organic compound" is meant a compound which when administered orally in aqueous solution to a patient causes substantially no undesirable effects in the patient. Suitable hydrochlorides of nitrogen-containing organic compounds are those of (a) a number of amino-acids, namely: glycine, alanine, phenylalanine, leucine and glutamic acid, and other α- and β-amino-acids containing carbon, hydrogen, oxygen and nitrogen only and not more than 6 carbon atoms; (b) N-alkyl substituted derivatives of glycine or its homologues of the formula:

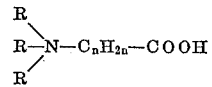

which can exist in the form of the inner salts or zwitterions of the formula:

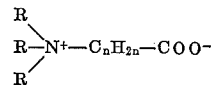

wherein the R symbols are the same or different and each represents an alkyl group containing not more than 4 carbon atoms( preferably methyl or ethyl) and $n$ represents an integer of from 1 to 3, for example betaine, i.e. the trimethyl derivative of glycine, and triethyl glycine; (c) the methyl, ethyl, propyl, isopropyl and benzyl esters of glycine, alanine, phenylalanine, leucine and glutamic acid, including the dimethyl and diethyl esters of glutamic acid; (d) amides of alanine, phenylalanine, glycine and glutamic acids; (e) N-methyl, N,N-dimethyl, N-ethyl and N,N-diethyl derivatives of glycine, alanine, phenylalanine and glutamic acids; (f) alkyl esters of betaine, or the N-methyl, N,N-dimethyl, N-ethyl or N,N-diethyl derivative of glycine, containing 1 to 3 carbon atoms in the alkyl radical; and (g) methyl and ethyl glucosamines. The references to glutamic acid in this specification and accompanying claims includes all isomers of the acid.

The particularly preferred hydrochloride incorporated in the compositions of the invention is betaine hydrochloride. Other hydrochlorides which, in addition to betaine hydrochloride, may preferentially be incorporated in the compositions of the invention are the hydrochlorides of glycine, N-methyl-, N-ethyl-, N,N-dimethyl- and N,N-diethyl-glycine and the methyl and ethyl esters of these five amino-acids, alanine or β-phenylalanine hydrochloride, glutamic acid hydrochloride, glutamic acid mono methyl or ethyl ester hydrochloride, glutamic acid dimethyl or diethyl ester hydrochloride, N-methyl-glutamic acid hydrochloride, alanine amide hydrochloride and glycine amide hydrochloride.

The compositions are advantageously in the form of tablets; however, they may also be in the form of powders or granules in paper packets, sachets or other pharmaceutical preparation forms for single dosage units of solid compositions. The compositions will usually also contain a sweetening agent, for example a sugar, saccharin or an alkali metal (e.g. sodium) derivative thereof, or cyclamic acid or salt thereof (preferably calcium cyclamate), and/or a flavouring agent such as oil of peppermint, to assist acceptance of an aqueous solution of the composition by the patient. Preferably they contain a combination of calcium cyclamate and peppermint oil in suitable proportions. When the compositions of the invention are to be in tablet form, a binding agent, which is advantageously a high molecular weight polyvinyl pyrrolidone, and small amounts of a lubricating agent, such as stearic acid and/or magnesium stearate, are incorporated in the compositions to facilitate tabletting of the ingredients.

The compositions of the invention are added to, and dissolved in, water before oral administration to a patient. On dissolution in water the hydrochloric acid liberated by dissociation of the hydrochloride of the nitrogen-containing organic compound reacts with the potassium bicarbonate or carbonate to form potassium chloride and gaseous carbon dioxide, which causes effervescence. The aqueous potassium chloride solution thus formed can be administered orally and has been found not to produce nausea. This may be due, at least in part, to the effect of the gaseous carbon dioxide simultaneously formed in the solution. Moreover, dissolution of the compositions in water, accompanied by effervescence and providing a palatable, drinkable solution, prevents the production of local concentrations of potassium chloride in the alimentary tract and thus avoids possible ulceration there. The free organic base simultaneously present in the formed aqueous solution, being physiologically innocuous, does not have any harmful effects on the patient; betaine has, so far, been found to be best in that respect.

The amounts of hydrochloride of the nitrogen-containing organic compound and potassium salt included in the compositions can be varied according to what is required in the aqueous solution to be administered. If it is required to produce potassium chloride in effervescent solution with no surplus potassium or chloride ion (i.e. 1 mole of potassium ion per mole of chloride ion), this is achieved by incorporating the substances in the theoretical proportions for quantitative reaction, producing only potassium chloride and the free nitrogen organic base. On the other hand, if it is required for any particular purpose to provide an excess or a deficiency of either the potassium or the chloride ion, the proportions of the two ingredients in the mixture can be varied accordingly. On addition to water of such mixtures, in which the quantities of potassium salt and hydrochloride are not in balance, there can be obtained in solution the required quantity of potassium chloride together with ether an excess of the original unaltered potassium salt or an excess of the hydrochloride providing the chloride ion.

The preferred compositions of the invention are those in which the hydrochloric acid source, i.e. the hydrochloride, provides in aqueous solution 1 mole of hydrogen chloride to react with 1 mole of potassium bicarbonate, or two or more moles of hydrogen chloride to react with 1 mole of the potassium salt, depending upon the number of available atoms of potassium in the salt.

The proportion of the two essential ingredients in the compositions of the invention are selected so as to produce a predetermined amount of potassium chloride on dissolution in water. In a preferred feature of the invention, the compositions are in the form of tablets which can produce an aqueous solution containing about 500 mg. of potassium chloride per tablet. A particularly preferred formulation of the invention is a tablet having the composition given in the following Example.

EXAMPLE 1

| | | |
|---|---|---|
| Betaine hydrochloride | g | 1.035 |
| Potassium bicarbonate | g | 0.675 |
| Calcium cyclamate | g | 0.05 |
| Peppermint oil | g | 0.004 |
| Polyvinyl pyrrolidone (M.W. 25,000) | g | 0.035 |
| Lubricants: | | |
| Stearic acid | percent by weight | 1 |
| Magnesium stearate | do | 1 |

On solution in water, or an aqueous liquid, one tablet of this composition will produce 500 mg. of potassium chloride.

Instead of 0.675 g. of potassium bicarbonate there may be used 0.465 g. of potassium carbonate.

Further pharmaceutical compositions of the present invention are given in the next Example.

EXAMPLE 2

Tablets are formed in the usual way, each having the composition:

| | | |
|---|---|---|
| Glycine hydrochloride | g | 0.750 |
| Potassium bicarbonate | g | 0.675 |
| Calcium cyclamate | g | 0.05 |
| Peppermint oil | g | 0.004 |
| Polyvinyl pyrrolidone (M.W. 25,000) | g | 0.035 |
| Lubricants: | | |
| Stearic acid | percent by weight | 1 |
| Magnesium stearate | do | 1 |

The stipulated amount of glycine hydrochloride may be replaced by 0.855 g. of glycine methyl ester hydrochloride, 1.325 g. of methyl glutamate hydrochloride, or 1.420 g. of dimethyl glutamate hydrochloride.

Tablets of all four such compositions on dissolution in water will produce 500 mg. of potassium chloride.

The following Example, in which the parts specified are by weight, gives illustrations of quantities of the hydrochloride of a nitrogen-containing compound, i.e. betaine, and potassium salt in compositions of the invention capable of giving on dissolution in water an excess or deficiency, as required, of one ion, chloride or potassium, in relation to the other.

EXAMPLE 3

(i) An excess of one mole of chloride ion (as HCl):

(a)

| | Parts |
|---|---|
| Betaine hydrochloride | 1.190 |
| Potassium bicarbonate | 0.675 |

(b)

| | Parts |
|---|---|
| Betaine hydrochloride | 1.190 |
| Potassium carbonate | 0.465 |

(ii) A deficiency of one mole of chloride ion (as HCl):

(c)

| | Parts |
|---|---|
| Betaine hydrochloride | 0.880 |
| Potassium bicarbonate | 0.675 |

(d)

| | Parts |
|---|---|
| Betaine hydrochloride | 0.880 |
| Potassium carbonate | 0.465 |

(iii) An excess of one mole of potassium ion:

(e)

| | Parts |
|---|---|
| Betaine hydrochloride | 1.035 |
| Potassium bicarbonate | 0.775 |

(f)

| | Parts |
|---|---|
| Betaine hydrochloride | 1.035 |
| Potassium carbonate | 0.605 |

(iv) A deficiency of one mole of potassium:

(g)

| | Parts |
|---|---|
| Betaine hydrochloride | 1.035 |
| Potassium bicarbonate | 0.575 |

(h)

| | Parts |
|---|---|
| Betaine hydrochloride | 1.035 |
| Potassium carbonate | 0.305 |

To such mixtures there may be added sweetening and/or flavouring agents and optionally other ingredients usually incorporated in solid compositions for tabletting purposes.

There may also be added to the compositions of the invention certain diuretics, so that these can be administered in normal dosages simultaneously with the potassium chloride. Such diuretics are, for example, 6-chloro-7-sulphamoyl-2H-benzo-1,2,4-thiadiazine-1,1-dioxide,
6-chloro-7-sulphamoyl-2H-benzo-1,2,4-thiadiazine-1,1-dioxide sodium,
6-chloro-3,4-dihydro-7-sulphamoyl-2H-benzo-1,2,4-thiadiazine-1,1-dioxide,
3,4-dihydro-7-sulphamoyl-6-trifluoromethyl-2H-benzo-1,2,4-thiadiazine-1,1-dioxide,
3-benzylthiomethyl-6-chloro-7-sulphamoyl-2H-benzo-1,2,4-thiadiazine-1,1-dioxide,
4-chlorobenzene-1,3-disulphonamide,
3-(4-chloro-3-sulphamoylphenyl)-3-hydroxy-1-oxo-isoindoline,
4-chloro-2-furfurylamino-5-sulphamoylbenzoic acid,
3-(bicyclo[2,2,1]hept-5-en-2-yl)-6-chloro-3,4-dihydro-7-sulphamoyl-2H-benzo-1,2,4-thiadiazine-1,1-dioxide,
6-chloro-3-chloromethyl-3,4-dihydro-2-methyl-7-sulphamoyl-2H-benzo-1,2,4-thiadiazine-1,1-dioxide,
3-benzyl-3,4-dihydro-7-sulphamoyl-6-trifluoromethyl-2H-benzo-1,2,4-thiadiazine-1,1-dioxide,
6-chloro-3,4-dihydro-2-methyl-7-sulphamoyl-3-(2,2,2-trifluoroethylthiomethyl)-2H-benzo-1,2,4-thiadiazine-1,1-dioxide, and
7-chloro-2-ethyl-1,2,3,4-tetrahydro-4-oxo-6-sulphamoylquinazoline.

The following Example illustrates a mixture which would give 250 mgm. of potassium chloride in aqueous solution and which contains an appropriate dosage of diuretic.

EXAMPLE 4

| | | |
|---|---|---|
| Glycine hydrochloride (or betaine hydrochloride 0.5175 g.) | g | 0.375 |
| Potassium bicarbonate | g | 0.3375 |
| Hydrochlorothiazide | g | 0.020 |
| Calcium cyclamate | g | 0.025 |
| Peppermint oil | g | 0.002 |
| Polyvinyl pyrrolidone (M.W. 25,000) | g | 0.0175 |
| Stearic acid | percent by weight | 1 |
| Magnesium stearate | do | 1 |

The dosage of potassium chloride administered daily to a patient utilising the compositions of the invention will vary greatly according to the requirements of the particular patient, but generally a dosage of from 1 to 10 grams of potassium chloride, by means of 2 to 20 tablets of the invention providing 0.5 g. of the solid salt in aqueous solution, is satisfactory.

I claim:
1. A dry composition for the treatment of hypokalaemia which comprises a mixture of
   (a) glycine hydrochloride, and
   (b) potassium bicarbonate, in an amount sufficient to cause effervescence upon the addition of said mixture to water, whereby a solution containing an antihypokalaemic effective amount of potassium, chloride is produced having an equimolar concentration of chloride and potassium ions.
2. The composition according to claim 1 in the form of a tablet.

References Cited
UNITED STATES PATENTS 3,708,574   1/1973   Corker _____ 424—44

OTHER REFERENCES

Merck Index, 8th edition, 1968, p. 145.
Wilson et al.: Textbook of Organic Medicinal and Pharmaceutical Chemistry, 1962, p. 730.

ALBERT T. MEYERS, Primary Examiner

N. A. DREZIN, Assistant Examiner

U.S. Cl. X.R.

424—316, 319